(12) United States Patent
Lewis

(10) Patent No.: US 7,483,685 B2
(45) Date of Patent: Jan. 27, 2009

(54) METHOD AND DEVICE FOR WAVELET DENOISING

(75) Inventor: Peter A. Lewis, Brighton (GB)

(73) Assignee: NXP B.V., Eindhoven (NL)

(*) Notice: Subject to any disclaimer, the term of this patent is extended or adjusted under 35 U.S.C. 154(b) by 309 days.

(21) Appl. No.: 10/518,259

(22) PCT Filed: Jun. 12, 2003

(86) PCT No.: PCT/IB03/02672

§ 371 (c)(1),
(2), (4) Date: Dec. 16, 2004

(87) PCT Pub. No.: WO2004/004143

PCT Pub. Date: Jan. 8, 2004

(65) Prior Publication Data

US 2006/0062321 A1    Mar. 23, 2006

(30) Foreign Application Priority Data

Jun. 26, 2002  (GB) ................... 0214729.6

(51) Int. Cl.
*H04B 1/10* (2006.01)

(52) U.S. Cl. .................. 455/296; 455/307; 455/308; 455/63.1; 375/346; 375/348; 375/350; 375/351

(58) Field of Classification Search ............... 455/63.1, 455/67.13, 296, 302, 307–312, 303–306; 375/346–348, 350–351

See application file for complete search history.

(56) References Cited

U.S. PATENT DOCUMENTS

| | | | | |
|---|---|---|---|---|
| 4,272,846 A | * | 6/1981 | Muratani et al. ............ 455/296 |
| 4,286,334 A | * | 8/1981 | Gammel et al. ............. 375/267 |
| 4,311,963 A | * | 1/1982 | Watanabe et al. ........... 327/310 |
| 4,626,788 A | * | 12/1986 | Ishigaki ....................... 327/180 |
| 4,879,729 A | * | 11/1989 | Salembier et al. ........... 375/350 |
| 4,953,183 A | * | 8/1990 | Bergmans et al. ........... 375/348 |
| 5,119,321 A | * | 6/1992 | Burton et al. ................ 702/194 |
| 5,428,832 A | * | 6/1995 | Nohara et al. ............... 455/296 |
| 5,479,440 A | * | 12/1995 | Esfahani ...................... 375/346 |
| 5,630,217 A | * | 5/1997 | Matsumoto .................. 455/222 |
| 5,692,017 A | * | 11/1997 | Shiokawa .................... 375/346 |
| 5,694,437 A | * | 12/1997 | Yang et al. ................... 375/346 |
| 5,794,136 A | * | 8/1998 | Buchwald et al. ........... 455/334 |
| 5,809,085 A | * | 9/1998 | Goodson et al. ............. 375/320 |
| 5,812,673 A | * | 9/1998 | Nohara et al. ................. 381/13 |
| 5,867,539 A | * | 2/1999 | Koslov ........................ 375/346 |
| 5,890,059 A | * | 3/1999 | Shoemaker et al. ......... 455/297 |
| 5,903,819 A | * | 5/1999 | Romesburg ................ 455/63.1 |
| 6,122,332 A | * | 9/2000 | Ogata et al. ................. 375/346 |

(Continued)

FOREIGN PATENT DOCUMENTS

| | | |
|---|---|---|
| EP | 1043874 A2 | 10/2000 |
| EP | 1043874 A3 | 11/2003 |

*Primary Examiner*—Edward Urban
*Assistant Examiner*—Rui Meng Hu

(57) ABSTRACT

The present invention provides for a digital receiver arrangement and related method, in which a digital receiver arrangement comprises a tuner/demodulator circuit, an analogue-to-digital converting means, and further includes means for storing an impulse wavelet representation, means for determining if an interference impulse is present in a received signal, and means for introducing the stored representation of the impulse wavelet to a detected received impulse so as to counteract the effect thereof within the received signal.

23 Claims, 2 Drawing Sheets

U.S. PATENT DOCUMENTS

Figure 1:
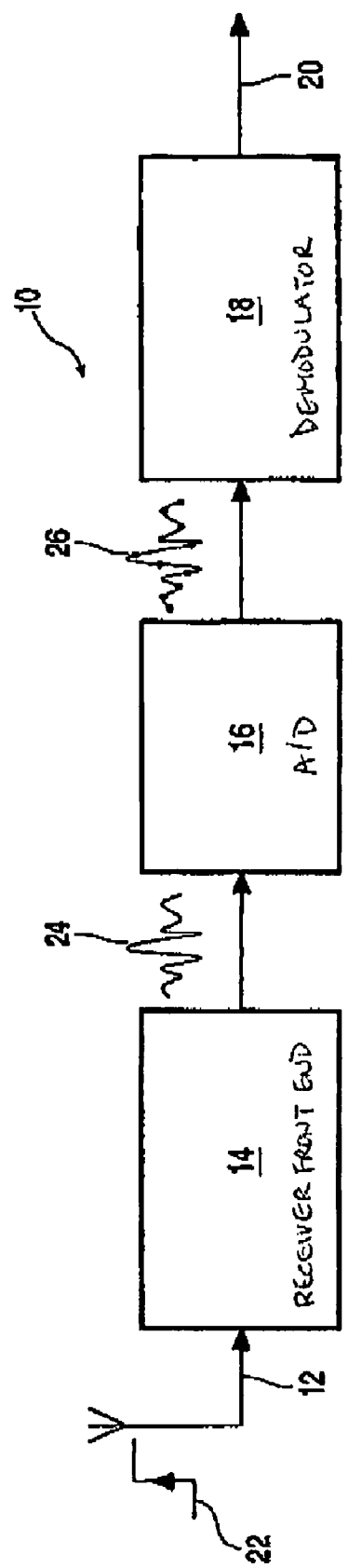

| | | | |
|---|---|---|---|
| 6,292,520 B1 * | 9/2001 | Tsukahara | 375/346 |
| 6,320,918 B1 * | 11/2001 | Walker et al. | 375/346 |
| 6,356,606 B1 * | 3/2002 | Hahm | 375/350 |
| 6,385,261 B1 * | 5/2002 | Tsuji et al. | 375/346 |
| 6,546,057 B1 * | 4/2003 | Yeap | 375/285 |
| 6,577,851 B1 * | 6/2003 | Ecklund et al. | 455/223 |
| 6,788,923 B2 * | 9/2004 | Tsujishita et al. | 455/223 |
| 6,795,559 B1 * | 9/2004 | Taura et al. | 381/94.8 |
| 6,920,194 B2 * | 7/2005 | Stopler et al. | 375/349 |
| 6,940,973 B1 * | 9/2005 | Yeap et al. | 379/416 |
| 6,993,309 B2 * | 1/2006 | Tsujishita et al. | 455/296 |
| 7,042,967 B2 * | 5/2006 | Reznik et al. | 375/346 |
| 7,286,809 B2 * | 10/2007 | Friesen et al. | 455/296 |
| 2001/0016475 A1 * | 8/2001 | Tsujishita et al. | 455/222 |
| 2001/0018331 A1 * | 8/2001 | Kuehn | 455/63 |
| 2001/0053181 A1 * | 12/2001 | Miyamoto et al. | 375/233 |
| 2002/0155812 A1 * | 10/2002 | Takada | 455/63 |
| 2002/0176524 A1 * | 11/2002 | Popper et al. | 375/346 |
| 2003/0022650 A1 * | 1/2003 | Tsuji | 455/296 |
| 2006/0256898 A1 * | 11/2006 | Popper et al. | 375/346 |

* cited by examiner

METHOD AND DEVICE FOR WAVELET DENOISING

CROSS-REFERENCE TO RELATED APPLICATIONS

This is a National Stage Application of International Patent Application No. PCT/IB03/02672, with an international filing date of Jun, 12, 2003, which is based on Application No. 021472906 filed in the United Kingdom on Jun. 26, 2002.

The present invention relates to a digital receiver and related method of receiving digital signals.

Digital broadcast systems such as the Coded Orthogonal Frequency Division Multiplexing (COFDM) have found particular use in Digital Audio Broadcasting (DAB) and Digital Terrestrial Television (DVB-T).

In such a broadcast system, the bits of each digital sample are distributed over a number of carriers and at a number of different time intervals. The carriers are each at a different evenly-spaced frequency within the transmission channel. The waveform in each time interval is normally created by an Inverse Fast Fourier Transform (IFFT) of the amplitude and phase values required for the carriers during that time interval.

The output of each IFFT creates a so-called symbol, which has duration of a symbol period. A plurality of such symbols are combined so as to form a COFDM frame. The COFDM frames are then transmitted and the distribution of bits of data across frequency and time provides for a system which is advantageously error resistant and can also cope with a high degree of multipath distortion.

In the receiver's demodulator a Fast Fourier Transform (FFT) is performed on the waveform in each symbol to determine the amplitude and phase of the carriers of which it is comprised. From these amplitude and phase values the data carried by the symbol is derived.

COFDM is a version of a communications system referred to as Orthogonal Frequency Division Multiplexing (OFDM). The features of which are described in greater detail in European Standard EN 300 744, V1.1.2 (1997-8), Digital Video Broadcasting (DVB); Framing Structure, channel coding and modulation for digital terrestrial television, published by European Telecommunications Standard Institute (ETSI) Valbonne, France, August 1997.

Disadvantages do however arise in that the sequentially transmitted symbols can be severely affected by short term noise events that can serve to distort each individual symbol. For example, COFDM based systems such as those discussed above, can be disrupted by strong interference from traffic-related switching events or high current switching events arising within domestic environments.

It would therefore be advantageous to try and limit the effect of noise, such as impulsive interference events, within digital signal transmission systems.

EP-A-1043874 discloses a COFDM receiver arrangement that seeks to limit the effect of impulsive interference events and in which the magnitude of a received signal is compared to threshold levels in an attempt to identify the presence of impulsive interference. If such threshold value is exceeded, then that portion of the signal exceeding the threshold is replaced by a zero value in an attempt to limit the effect of the interference.

However, such a system is disadvantageously limited insofar as its operation depends upon a mere comparison of magnitude and threshold value and so an inaccurate determination of the presence of impulsive interference events can prove common. Also, the mere replacement of a likely interference impulse merely by a zero value does not necessarily lead to a fully accurate recreation of the original signal absent to the interference impulse.

The present invention therefore seeks to provide for a digital receiver arrangement, and related method, having advantages over known such arrangements and methods.

According to a first aspect of the present invention, there is provided a digital receiver arrangement comprising a tuner/demodulator circuit and analogue-to-digital converting means, and further including means for storing an impulse wavelet representation, means for determining if an interference impulse is present in a received signal, and means for introducing the stored representation of the impulse wavelet to the detected received impulse so as to counteract the effect thereof within the received signal.

The invention is advantageous in providing means for accurately seeking to remove an interference impulse from an incoming digital signal and in a manner having limited effect on the remainder of the signal.

The feature of Claim 2 represents a particularly accurate and efficient means for determining the arrival of an impulse interference event within a received signal and the features of the Claims 3 and 4 comprise advantageous embodiments of such means.

The feature of Claim 5 is advantageous in offering a particularly simple, and effective means serving to remove the impulse interference event from the received signal.

The feature of Claim 6 proves particularly advantageous in generating a stored representation of an impulse infringement event that can offer a high degree of accuracy when compared with an incoming impulse interference event in the received signal.

The features of Claim 10 and 11 prove particularly advantageous in enhancing the accuracy with which an impulse interference event can be effectively removed from the received incoming digital signal.

According to another aspect of the present invention, there is provided a method of receiving a digital signal including the steps of demodulating the signal, and conducting an analogue-to-digital conversion of the signal, and including the further steps of storing an impulse wavelet representation, determining if an impulse interference event is found within an incoming signal, and introducing the said stored wavelet representation to the received impulse interference event so as to counteract the effect thereof.

As will therefore be appreciated, the present invention provides for means for detecting the occurrence of an elementary impulsive interference event by identifying a sequence of perturbation to the received data characteristic of the effect of applying a fast voltage step to the input of the receiver system. Particularly advantageously, means are provided for characterising the data perturbation as expected from an elementary impulsive interference event by an automatic learning process performed, for example, when the digital receiver is first commissioned or each time it is switched on.

A means for reducing the effect of an elementary impulsive interference event by subtracting a scaled version of the data perturbation sequence respected from such an event is therefore achieved.

It will of course be appreciated that the present invention can readily be incorporated into integrated circuits provided for demodulating DVB-T signals in order to reduce the effect of such interference.

The invention thus provides for a receiver with improved immunity to impulsive interference events and so finds ready use particularly in DAB and DVB-T systems.

Figure 2:
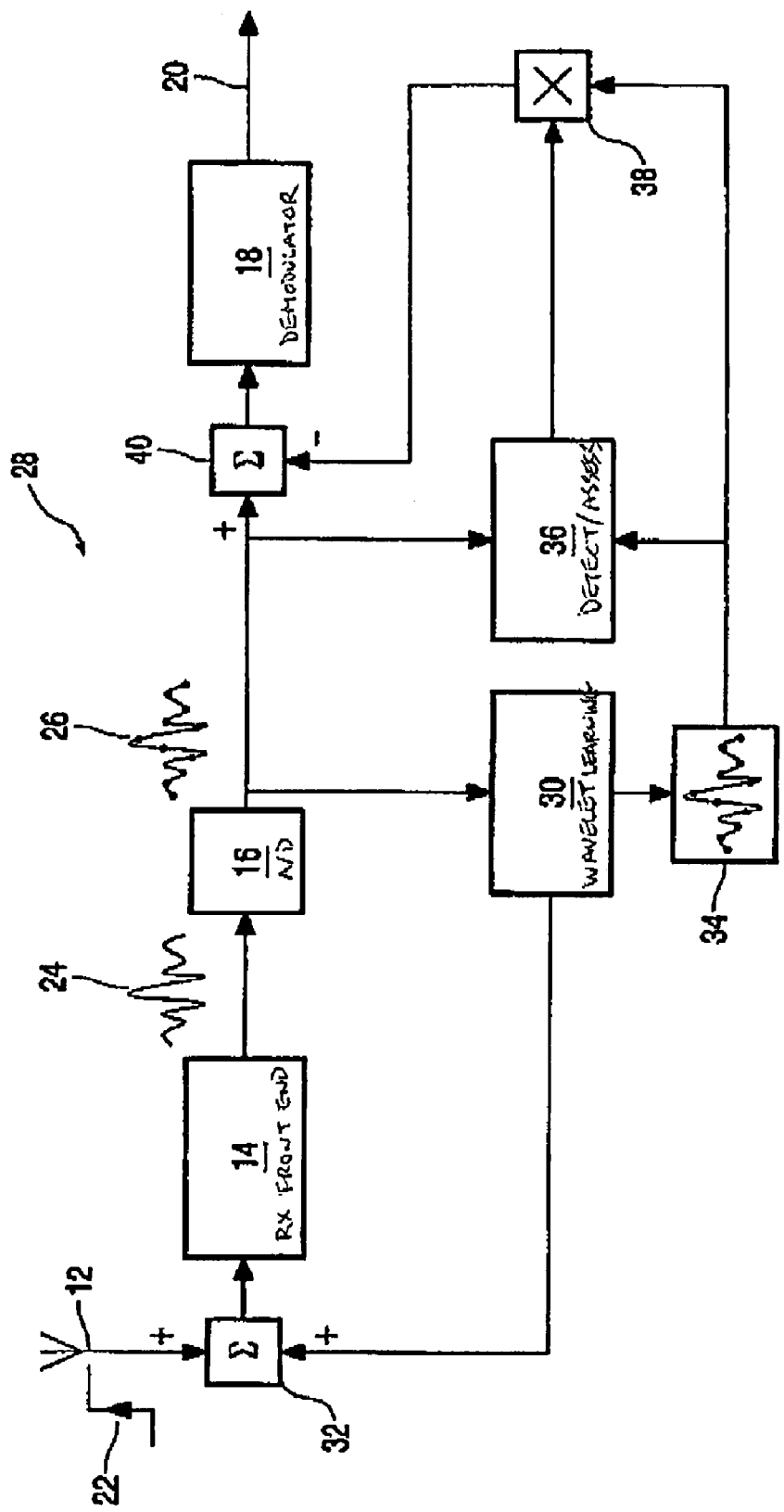

The invention is described further hereinafter, by way of example only, with reference to the accompanying drawings in which:

FIG. 1 represents a schematic block diagram of a known digital receiver system and so as to illustrate the manner in which an impulsive interference event arises; and FIG. 2 is a schematic block diagram of a receiver arrangement according to an embodiment of the present invention.

Turning first to FIG. 1 there is illustrated a block diagram of a typical digital receiver arrangement 10 for receiving digital wireless signals and which comprises an antenna 12 connected to a front-end system 14, which typically includes tuning and filtering devices. The front-end system 14 is in turn connected to analogue-to-digital conversion means 16, which delivers an output digital signal to the remainder of the demodulation system 18.

In turn, this remainder of the demodulation system 18 provides for a digital data output 20.

The front-end system 14 serves to translate the desired range of frequencies to a required intermediate frequency range and also serve to attenuate other frequencies.

Also illustrated within FIG. 1 is an incoming impulsive interference event, which could disadvantageously result in one or more bursts of pulses at the output of the front-end system 14. It should be appreciated that each pulse within a burst is usually caused by a fast interference voltage edge received at the antenna 12 and an example of such a fast interference voltage edge 22 is also illustrated in FIG. 1. Such edges and their consequences comprise elementary impulsive interference events.

Although a signal edge, or a train of edges, might appear at the antenna 12, each will produce a waveform 24 such as that illustrated at the output side of the front-end system 14 in FIG. 1. The amplitude and shape of this waveform 24 is determined by the time response of the antenna 12 and the front-end system 14. The waveform 24 can be thought of as comprising an impulse wavelet. Such an impulse wavelet 24 will arise in addition to the desired signal received at the antenna and at the output of the analogue-to-digital converter 16, the voltage edge 22 received at the antenna 12 has by then served to create a sequence of data perturbation values 26 of the wavelet 24 such as those also illustrated in FIG. 1.

In practice, such data perturbation values 26 will be complex in nature and so have real and imaginary parts and will also be dependent upon the sampling process. In principle however, the additional impulse wavelet maybe identifiable within the data and, once it has been assessed, it can be subtracted from the received signals to provide for improved accuracy of reproduction of the received signal.

Turning now to FIG. 2, there is illustrated a schematic block diagram of a receiver arrangement 28 according to one embodiment of the present invention.

The receiver arrangement 28 of FIG. 2 includes some of the typical features illustrated in FIG. 1 and so, where appropriate, common reference numerals have been employed.

Thus, it will be appreciated that the receiver arrangement embodying the present invention also comprises an antenna 12, front-end system 14, an analogue-to-digital converter 16 and a block 18 representing the remainder of the demodulation system for providing a digital data output 20.

Importantly however, the embodiment of the present invention has additional features as discussed below.

An impulse wavelet learning system 30 is included for tapping into the output of the analogue-to-digital converter 16 so as to form an estimate of the shape of an impulse wavelet 24 likely to arrive at the analogue-to-digital converter 16. The operation of such a learning system 30 can include the application of a known test signal via a summation device 32, which serves to receive signals from both the impulse wavelet learning system 30 and also the antenna 12, and then deliver an input to the front-end system 14. The known test signal can be created at the time that the arrangement 28 is designed, or commissioned, or indeed each time the arrangement 28 is switched on. In the alternative however, the wavelet shape maybe predicted from the known characteristics of the arrangement 28, or by some other appropriate means. However the irrespective manner in which the estimate of the shape of the impulse wavelet is obtained, once created, the estimate of the wavelet is stored within a memory unit 34.

During operation of the arrangement 28 of FIG. 2, any perturbation in the received data due to an impulsive edge 22 received at the antenna 12 is detected and assessed by an impulse wavelet detection and assessment system 36 which, as with the impulse wavelet learning system 30, taps into the input of the analogue-to-digital converter 16. Such detection and assessment system 36 is arranged to compare continually the received data with the impulse wavelet shape stored in the memory 34. In this manner, the detection and assessment system can employ a continuous cross-correlation, or optimal filtering, circuit. Once having detected an impulse wavelet perturbation within the signal output from the analogue-to-digital converter 16, the detection and assessment system 36 serves to assess the amplitude and phase of the perturbation or, if dealing with a complex value, the real and imaginary components thereof are assessed.

Such assessment of wavelet amplitude and phase are then delivered to a multiplier 38, which is also arranged to receive an output of the estimate stored in the memory 34.

The multiplier 38 is also arranged to scale the stored wavelet shape to form a more accurate estimate of the identified interference pulse which is then subtracted from the incoming data within a summation device 40 so as to produce a less-corrupted data sequence which is then delivered to the remainder of the demodulation system 18.

Thus, as will be appreciated, the present invention provides for a relatively simple and effective means for producing a digital receiver system in which a fast interference voltage edge received at the antenna, such as an elementary impulsive interference event and which results in an unwanted waveform added to the required signal, allows for processing at the impulse wavelet level and which impulsive wavelet is removed from the front-end processed and digitised signal so as to effectively remove the effect of the impulsive interference event.

The removal of the impulsive wavelet by means of an estimate of that wavelet serves to enhance the accuracy of the noise suppression offered by the present invention.

The invention claimed is:

1. A digital receiver arrangement comprising a tuner/demodulator circuit and analogue-to-digital converting means, and further including means for storing an impulse wavelet representation characteristic of an impulse noise event, wherein the impulse wavelet representation comprises a sequence of data perturbation values, means for determining if an interference impulse is present in a received signal, and means for combining the stored representation of the impulse wavelet with the detected received impulse only if an interference impulse is determined to be present in the received signal so as to counteract the effect thereof within the received signal, wherein the means for determining if an impulse arises comprises comparison means for comparing the stored impulse wavelet representation with a wavelet arising in the received signal.

2. An arrangement as claimed in claim 1, wherein the comparison means comprises a cross-correlator.

3. An arrangement as claimed in claim 1, wherein the comparison means includes optimal filtering means.

4. An arrangement as claimed in claim 1, wherein the means for combining the stored representation with the received signal includes subtractor means for subtracting the stored wavelet representation from the incoming impulse wavelet.

5. An arrangement as claimed in claim 1, and including means for determining an estimate of the shape of the impulse wavelet and for storing such estimate in the said means for storing an impulse wavelet representation.

6. An arrangement as claimed in claim 5, wherein the estimate of the shape of the impulse wavelet is created by means of a test signal.

7. An arrangement as claimed in claim 1, wherein the means for storing the impulse wavelet is arranged to receive a pre-programmed representation of the wavelet.

8. An arrangement as claimed in claim 1, and including prediction means for predicting the likely shape of an impulse wavelet for storage within the said means for storing.

9. An arrangement as claimed in claim 1, and including means for scaling the stored impulse wavelet having regard to characteristics of the impulse wavelet within the received signal.

10. An arrangement as claimed in claim 9, wherein the said characteristic comprises at least one of the amplitude and phase of the impulse wavelet within the received signal.

11. A method of receiving a digital signal including the steps of demodulating a received signal, and conducting an analogue-to-digital conversion of the demodulated signal, and including the further steps of storing an impulse wavelet representation characteristic of an impulse noise event, wherein the impulse wavelet representation comprises a sequence of data perturbation values, determining if an impulse interference event is found within an incoming signal, and combining the said stored impulse wavelet representation with the received impulse interference event only if an interference impulse is determined to be present in the incoming signal so as to counteract the effect thereof, wherein said step of determining includes comparing the stored impulse wavelet representation with a wavelet arising in the incoming signal.

12. A method as claimed in claim 11 and including the step of subtracting the stored wavelet representation from the received impulse interference event.

13. A method as claimed in claim 11 and including the step of estimating the wavelet representation to be stored.

14. A method as claimed in claim 11, and including the step of scaling the stored wavelet representation responsive to characteristics of the incoming signal.

15. A digital receiver arrangement comprising:
  a tuner/demodulator circuit;
  an analogue-to-digital converter;
  a datastore;
  an impulse wavelet learning system, wherein the impulse wavelet learning system comprises instructions for:
    receiving the output of the analogue-to-digital converter;
    determining if an interference impulse is present in a received signal;
    forming an estimate of a shape of an impulse wavelet within the interference pulse,
    wherein the estimate of the shape of the impulse wavelet comprises a sequence of data perturbation values; and
    storing the estimate of the shape of the impulse wavelet in the datastore;
  a detection system, wherein the detection system comprises instructions for:
    receiving the output of the analogue-to-digital converter in response to an incoming signal; and
    comparing the output of the analogue-to-digital converter to the stored estimate of the shape of the impulse wavelet and acquiring attributes of the stored estimate of the shape of the impulse wavelet; and
  a multiplier, wherein the multiplier comprises instructions for:
    receiving the stored estimate of the shape of the impulse wavelet from the datastore;
    receiving attributes of the stored estimate of the shape of the impulse wavelet;
    scaling the stored wavelet shape to form a more accurate estimate of the impulse wavelet;
    subtracting the estimate of the impulse wavelet from output of the analogue-to-digital converter to produce a modified incoming signal; and
    delivering the modified signal to the tuner/demodulator circuit.

16. An arrangement as claimed in claim 15, wherein the instruction for comparing the output of the analogue-to-digital converter to the stored estimate of the shape of the impulse wavelet and acquiring attributes of the stored estimate of the shape of the impulse wavelet is performed by a cross-correlator.

17. An arrangement as claimed in claim 15, wherein the instruction for comparing the output of the analogue-to-digital converter to the stored estimate of the shape of the impulse wavelet and acquiring attributes of the stored estimate of the shape of the impulse wavelet is performed by optimal filtering means.

18. An arrangement as claimed in claim 15, wherein the instruction for subtracting the estimate of the impulse wavelet from output of the analogue-to-digital converter to produce a modified incoming signal is performed by a summing circuit.

19. An arrangement as claimed in claim 15, wherein instruction for forming an estimate of a shape of an impulse wavelet is performed using a test signal.

20. An arrangement as claimed in claim 15, wherein the multiplier further comprises instructions for selecting a predetermined stored estimate of the shape of the impulse wavelet from the datastore.

21. An arrangement as claimed in claim 15, wherein the attributes of the stored estimate of the shape of the impulse wavelet comprises at least one of the amplitude and phase of the impulse wavelet within the received signal.

22. A method of receiving a digital signal comprising:
  demodulating a received digital signal;
  conducting an analogue-to-digital conversion of the received digital signal;
  determining if an interference impulse is present in the received digital signal;
  forming an estimate of a shape of an impulse wavelet within the interference pulse, wherein the estimate of the shape of the impulse wavelet comprises a sequence of data perturbation values;
  storing the estimate of the shape of the impulse wavelet in the datastore;
  demodulating an incoming signal;
  conducting an analogue-to-digital conversion of the incoming signal;

comparing the output of the analogue-to-digital converter to the stored estimate of the shape of the impulse wavelet and acquiring attributes of the stored estimate of the shape of the impulse wavelet;

receiving the stored estimate of the shape of the impulse wavelet from the datastore;

receiving attributes of the stored estimate of the shape of the impulse wavelet;

scaling the stored wavelet shape to form a more accurate estimate of the impulse wavelet;

subtracting the estimate of the impulse wavelet from converted incoming signal to produce a modified signal;

delivering the modified signal to a tuner/demodulator circuit.

23. A method as claimed in claim 22, wherein the attributes of the stored estimate of the shape of the impulse wavelet comprise at least one of an amplitude and a phase of the impulse wavelet within the incoming signal.

* * * * *